United States Patent
Metcalfe et al.

(10) Patent No.: US 9,551,820 B2
(45) Date of Patent: Jan. 24, 2017

(54) ELECTROMAGNETIC COMPOSITE-BASED REFLECTING TERAHERTZ WAVEPLATE

(75) Inventors: Grace D. Metcalfe, Bethesda, MD (US); Michael Wraback, Germantown, MD (US); Andrew Clare Strikwerda, Jamaica Plain, MA (US); Richard Douglas Averitt, Newton, MA (US); Kebin Fan, Boston, MA (US); Xin Zhang, Medford, MA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1210 days.

(21) Appl. No.: 13/566,452

(22) Filed: Aug. 3, 2012

(65) Prior Publication Data

US 2015/0301254 A1 Oct. 22, 2015

Related U.S. Application Data

(60) Provisional application No. 61/514,772, filed on Aug. 3, 2011.

(51) Int. Cl.
G02B 5/30 (2006.01)
(52) U.S. Cl.
CPC ........... G02B 5/3083 (2013.01); G02B 5/3066 (2013.01)
(58) Field of Classification Search
CPC ....... G02B 5/3025; G02B 27/285; G02B 5/30; G02B 5/3041; G02B 5/3083; G02B 5/3008; G02B 5/3016; G02B 6/10; G02B 5/208; G02B 5/3058; G02B 6/001; G02B 6/0841; G02B 26/02; B82Y 20/00; G02F 1/167; G02F 1/308; G02F 1/0123
USPC ...... 359/485.01–485.07, 350, 352, 245–247,359/254, 259; 385/129–132
See application file for complete search history.

(56) References Cited

U.S. PATENT DOCUMENTS

| | | | | |
|---|---|---|---|---|
| 7,580,604 B2 * | 8/2009 | D'Aguanno | ........... | B82Y 20/00 359/321 |
| 7,826,504 B2 * | 11/2010 | Chen | ...................... | H03C 7/027 343/700 MS |
| 8,130,031 B2 * | 3/2012 | Nguyen | ................. | G02B 1/002 327/565 |

OTHER PUBLICATIONS

Goldstein, D., "Polarized Light," Second Edition, Air Force Research Laboratory, Marcel Decker,Inc., New York, pp. 31-35, 211-221 (2003).
A. Strikwerda, K. Fan, H. Tao, D. Pilon, X. Zhang, and R. Averitt, "Comparison of birefringent electric split-ring resonator and meanderline structures as quarter-wave plates at terahertz frequencies," Opt. Express 17, 136-149 (2009).
Weiss, p., et al., "Strongly birefringent metamaterials as negative index terahertz wave plates," Applied Physics Letters 95, 171104 (2009).
B. B. Hu and M. C. Nuss, "Imaging with Terahertz Waves," Opt. Lett. 20, 1716-1718 (1995).
D. M. Mittleman, et al., "Noncontact Semiconductor Wafer Characterization with the Terahertz Hall Effect," Appl. Phys. Lett. 71, 16-18 (1997).

(Continued)

*Primary Examiner* — Scott J Sugarman
*Assistant Examiner* — Kristina Deherrera
(74) *Attorney, Agent, or Firm* — Lawrence E. Anderson

(57) ABSTRACT

A reflection-mode waveplate for operation in the terahertz region by shifting the phase between two perpendicular polarization components of the light wave, comprising a ground plane; an array of polygonal unit cells; the polygonal unit cells comprising a polymer positioned between the ground plane and the exterior of the array of polygonal patches.

14 Claims, 16 Drawing Sheets

(56) References Cited

OTHER PUBLICATIONS

R. H. Jacobsen, D. M. Mittleman and M. C. Nuss, "Chemical Recognition of Gases and Gas Mixtures with Terahertz Waves," Opt. Lett. 21, 2011-2013 (1996).

T. W. Crowe, et al., Terahertz Sources and Detectors and Their Application to Biological Sensing, Philosophical Transactions, Royal Society A 362, 365-377 (2004).

P.H. Siegel, "THz Technology," IEEE Trans. Microwave Theory and Techniques, 50(3), 910-928, (2002).

V. G. Veselago, "The Electrodynamics of Substances with Simultaneously Negative Values of $\epsilon$ and $\mu$," Sov. Phys. Usp. 10, 509-514 (1968).

D. R. Smith, et sl., "Composite Medium with Simultaneously Negative Permeability and Permittivity," Phys. Rev. Lett. 84, 4184-4187 (2000).

J. B. Pendry, "Negative Refraction Makes a Perfect Lens," Phys. Rev. Lett. 85, 3966 (2000).

D. Schurig, et al., "Metamaterial Electromagnetic Cloak at Microwave Frequencies," Science 314, 977-980 (2006).

N. I. Landy, et al., "Perfect metamaterial absorber," Phys. Rev. Lett., 100, 207402 (2008).

D. F. Sievenpiper, L. Zhang, R. Broas, N. G. Alexopolous, E. Yablonovitch, "High-Impedance Electromagnetic Surfaces with a Forbidden Frequency Band," IEEE Trans. Microwave Theory and Techniques, 47(11), 2059-2074, (1999).

O. Luukkonen, et al. "Grounded uniaxial material slabs as magnetic conductors," Progress in Electromagnetics Research B, 15, 267-283 (2009).

H. T. Chen, et al., "Active terahertz metamaterial devices," Nature, 444, 597 (2006).

H. T. Chen, et al., "Experimental demonstration of frequency-agile terahertz metamaterials," Nature Photonics, 2, 295 (2008).

H. Tao, et al., "Reconfigurable Terahertz Metamaterials," Phys. Rev. Lett., 103, 147401 (2009).

X. G. Peralta, et al., "Metamaterials for THz polarimetric devices," Opt. Express 17, 773-783 (2009).

H. Tao, et al. Highly Flexible Wide Angle of Incidence Terahertz Metamaterial Absorber: Design, Fabrication, and Characterization, Phys. Rev. B 78, 241103 (2008).

A. Majewski, R. Abreu, and M. Wraback, "A High Resolution Terahertz Spectrometer for Chemical Detection," Proc. SPIE 6549, 65490B (2007), DOI:10.1117/12.719485.

\* cited by examiner

ELECTROMAGNETIC COMPOSITE-BASED REFLECTING TERAHERTZ WAVEPLATE

GOVERNMENT INTEREST

The invention described herein may be manufactured, used, and/or licensed by or for the United States Government.

CROSS REFERENCE TO RELATED APPLICATIONS

This is a nonprovisional application of Provisional Application No. 61/514,772 having the same title filed Aug. 3, 2011.

BACKGROUND OF THE INVENTION

In recent years, it has been realized that the THz region of the electromagnetic spectrum is of considerable scientific and technological interest which has lead to advances that include THz imaging (see, B. B. Hu and M. C. Nuss, "Imaging with Terahertz Waves," Opt. Lett. 20, 1716-1718 (1995) hereby incorporated by reference), semiconductor characterization (see, D. M. Mittleman, J. Cunningham, M. C. Nuss and M. Geva, "Noncontact Semiconductor Wafer Characterization with the Terahertz Hall Effect," Appl. Phys. Lett. 71, 16-18 (1997), hereby incorporated by reference), and chemical (see, R. H. Jacobsen, D. M. Mittleman and M. C. Nuss, Chemical Recognition of Gases and Gas Mixtures with Terahertz Waves, Opt. Lett. 21, 2011-2013 (1996), (hereby incorporated by reference) and biological sensing (see T. W. Crowe, T. Globus, D. L. Woolard and J. L. Hesler, Terahertz Sources and Detectors and Their Application to Biological Sensing, Philosophical Transactions," Royal Society A 362, 365-377 (2004) hereby incorporated by reference. However, the THz spectrum still suffers from the often cited "THz gap," which refers to the lack of basic components available in this frequency range. See, P. H. Siegel, THz Technology, *IEEE Trans. Microwave Theory and Techniques*, 50(3), 910-928, (2002), hereby incorporated by reference. This deficiency has been reduced, in part, through the use of scalable artificial electromagnetic composites such as metamaterials and frequency selective surfaces. Multifunctional electromagnetic composites derive their response primarily from the geometry of unit cells arrayed in a periodic fashion. Through ingenious design, these materials have been used to create a negative index of refraction (see, V. G. Veselago, The Electrodynamics of Substances with Simultaneously Negative Values of $\in$ and $\mu$," Sov. Phys. Usp. 10, 509-514 (1968) and D. R. Smith, W. J. Padilla, D. C. Vier, S. C. Nemat-Nasser, and S. Schultz, "Composite Medium with Simultaneously Negative Permeability and Permittivity, Phys. Rev. Lett. 84, 4184-4187 (2000), both of which are incorporated by reference), perfect lens (see J. B. Pendry, Negative Refraction Makes a Perfect Lens, Phys. Rev. Lett. 85, 3966 (2000), hereby incorporated by reference), electromagnetic cloak (see D. Schurig, J. J. Mock, B. J. Justice, S. A. Cummer, J. B. Pendry, A. F. Starr, and D. R. Smith, Metamaterial Electromagnetic Cloak at Microwave Frequencies, *Science* 314, 977-980 (2006), hereby incorporated by reference), perfect absorber (see N. I. Landy, et al., Perfect metamaterial absorber, Phys. Rev. Lett., 100, 207402 (2008), hereby incorporated by reference), high impedance surfaces (see D. F. Sievenpiper, L. Zhang, R. Broas, N. G. Alexopolous, E. Yablonovitch, "High-Impedance Electromagnetic Surfaces with a Forbidden Frequency Band, "*IEEE Trans. Microwave Theory and Techniques*, 47(11), 2059-2074, (1999), hereby incorporated by reference), and magnetic conductors (see, O. Luukkonen, C. R. Simovski, and S. A. Tretyakov. Grounded uniaxial material slabs as magnetic conductors, *Progress In Electromagnetics Research B*, 15, 267-283 (2009), hereby incorporated by reference.

At THz frequencies, active electromagnetic composites have been developed including voltage controlled modulators and phase shifters, and reconfigurable materials as reported in H. T. Chen, et al., Active terahertz metamaterial devices, Nature, 444, 597 (2006), H. T. Chen, et al., Experimental demonstration of frequency-agile terahertz metamaterials, Nature Photonics, 2, 295 (2008), and H. Tao, et al., Reconfigurable Terahertz Metamaterials, Phys. Rev. Lett., 103, 147401 (2009). All of these devices were created through precise design of metallo-dielectric unit cells. The geometry of the metallic structure within the unit cell imbues the composite with macroscopic properties not found in its constituent components. As with atomic materials, the point group symmetry of the unit cell maps onto the macroscopic properties. A prime example are unit cells which lack fourfold rotational symmetry which manifests as birefringence in the material response. This lack of symmetry has been previously exploited to make transmissive waveplates as referenced in A. C. Strikwerda, Fan, Hu Tao, D. V. Pilon, X. Zhang, and R. D. Averitt, Comparison of birefringent electric split-ring resonator and meanderline structures as quarter-wave plates at terahertz frequencies, Opt. Express 17, 136-149 (2009), X. G. Peralta, E. I. Smirnova, A. K. Azad, H.-T. Chen, A. J. Taylor, I. Brener, and J. F. O'Hara, Metamaterials for THz polarimetric devices, Opt. Express 17, 773-783 (2009), and P. Weis, O. Paul, C. Imhof, R. Beigang, and M. Rahm, "Strongly birefringent metamaterials as negative index terahertz wave plates," Appl. Phys. Lett. 95, 171104 (2009). However these, and other typical THz components, suffer high insertion loss which arises from Fresnel losses which can be substantial as typical materials at THz frequencies have large refractive indices. This can be remedied through the use of anti-reflection (AR) coatings, but in foregoing references (A. C. Strikwerda, Fan, Hu Tao, D. V. Pilon, X. Zhang, and R. D. Averitt, "Comparison of birefringent electric split-ring resonator and meanderline structures as quarter-wave plates at terahertz frequencies," Opt. Express 17, 136-149 (2009), X. G. Peralta, E. I. Smirnova, A. K. Azad, H.-T. Chen, A. J. Taylor, I. Brener, and J. F. O'Hara, Metamaterials for THz polarimetric devices, Opt. Express 17, 773-783 (2009), and P. Weis, O. Paul, C. Imhof, R. Beigang, and M. Rahm, "Strongly birefringent metamaterials as negative index terahertz wave plates," Appl. Phys. Lett. 95, 171104 (2009)) the AR coatings would be thicker than the actual device, which may be disadvantageous in either fabrication or implementation.

In P. Weiss, et al., "Strongly birefringent metamaterials as negative index terahertz wave plates," Applied Physics Letters 95, 171104 (2009) (hereby incorporated by reference), there is reported an alternative approach for the design and fabrication of thin wave plates with high transmission in the terahertz regime. The wave plates are based on strongly birefringent cut-wire-pair metamaterials that exhibit refractive indices of opposite signs for orthogonal polarization components of an incident wave.

Referring now to FIG. 1, a half waveplate rotates linearly polarized light by 90 degrees. A quarter waveplate converts linearly polarized light into circularly polarized light.

SUMMARY OF THE INVENTION

A preferred embodiment comprises a waveplate for operation in a reflection mode (at a 45° angle of incidence), thereby eliminating an avenue of potential powerloss. The reflection-mode metamaterial waveplate can be static or dynamic. In the static case, the electromagnetic response of the metamaterial does not change. In the dynamic case, the electromagnetic response of the metamaterial can be altered by applying an external bias, such as an electrical voltage or optical excitation beam.

A preferred embodiment comprises a reflection-mode waveplate for operation in the terahertz region by shifting the phase between two perpendicular polarization components of the light wave, comprising a ground plane; an array of polygonal unit cells; the polygonal unit cells comprising a polymer positioned between the ground plane and the exterior of the array of polygonal patches.

Another preferred embodiment comprise a waveplate comprising an array of unit cells; each unit cell comprising a ground layer; a polymer material layer; a layer of GaAs; an n-type GaAs thin layer grown on the GaAs layer; and a split ring resonator fabricated on the n-type GaAs thin layer grown on GaAs; the split ring resonator having a gap such that when a reverse bias is applied between the ground layer and the split ring resonator, the carriers in the gap are depleted and the split ring resonator resonance turns on.

Another preferred embodiment comprises a waveplate comprising an array of unit cells; each unit cell comprising a ground layer; a sapphire layer; a silicon thin layer grown on the sapphire layer; and a split ring resonator fabricated on the silicon thin layer grown on sapphire; the split ring resonator having a gap such that when an optical pump beam is applied to the gap region, photoexcited carriers in the gap short the gap and the split ring resonator resonance turns off.

Referring now to FIG. 2, the unit cell pictured is of a static reflection-mode half waveplate 10 which is arrayed infinitely in both the horizontal and vertical directions. The rectangular patch 11 is 119 µm×194 µm and the periodicity may be, for example, 195 µm×234 µm. The polyimide spacer 12 thickness is 68 µm and there is a continuous gold ground plane on the back side (not shown in FIG. 2). All light colored (gold) structures may be approximately 200 nm thick.

Referring now to FIG. 3, the unit cell pictured of an electrically modulated reflection-mode quarter waveplate 20 comprising an electrical split ring resonator (SRR) metamaterial (ohmic contact) 21 fabricated on a 2 mm n-type GaAs thin layer grown on GaAs using molecular beam epitaxy. The material is etched such that n-type GaAs remains only in the gap 23 of the SRR. Reverse bias between the gold ground plane Schottky contact 22 and the SRR metamaterial ohmic contact 21 depletes the carriers in the gap and turns on the SRR resonance. A layer of polyimide separates the SRR and the gold ground plane.

Referring now to FIG. 4, the unit cell of an optically modulated reflection-mode quarter waveplate pictured is an optically modulated reflection-mode quarter waveplate. The electrical SRR 21 is fabricated on silicon on sapphire. The material is etched so Si remains only in the gap 23. Photoexcitation by an optical beam generates electron-hole pairs in the Si thereby shorting the gap and turning off the SRR resonance. The electrical split ring resonator (SRR) is fabricated on silicon on sapphire. The material is etched so Si remains only in the gap. Photoexcitation generates electron-hole pairs in the Si thereby shorting the gap and turning off the SRR resonance.

DESCRIPTION OF THE PREFERRED EMBODIMENTS

Figure 1:
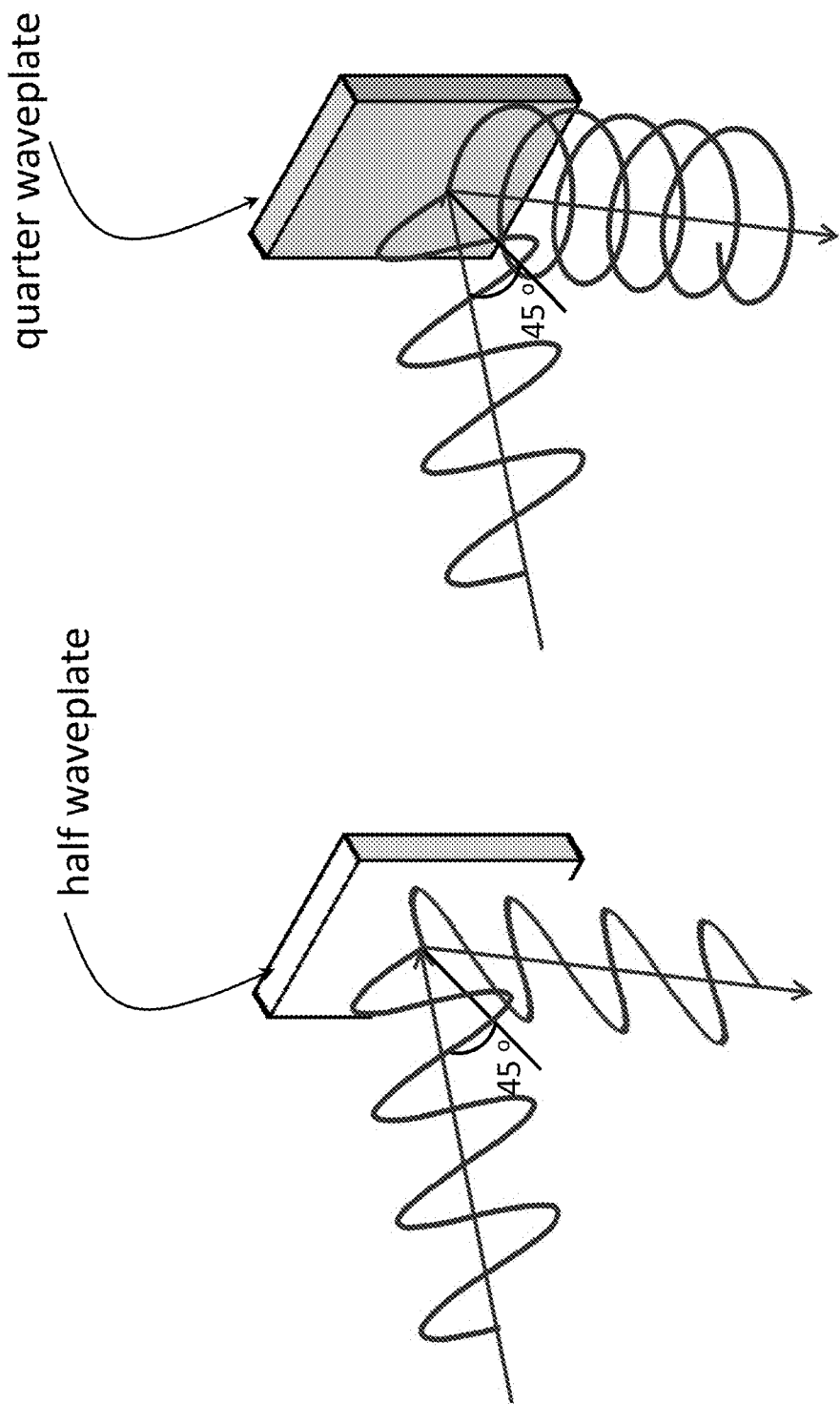
FIG. 1 illustrates a half waveplate which can rotate linearly polarized light by 90 degrees on the left. On the right, a quarter waveplate which can convert linearly polarized light into circularly polarized light is shown.
Figure 2:
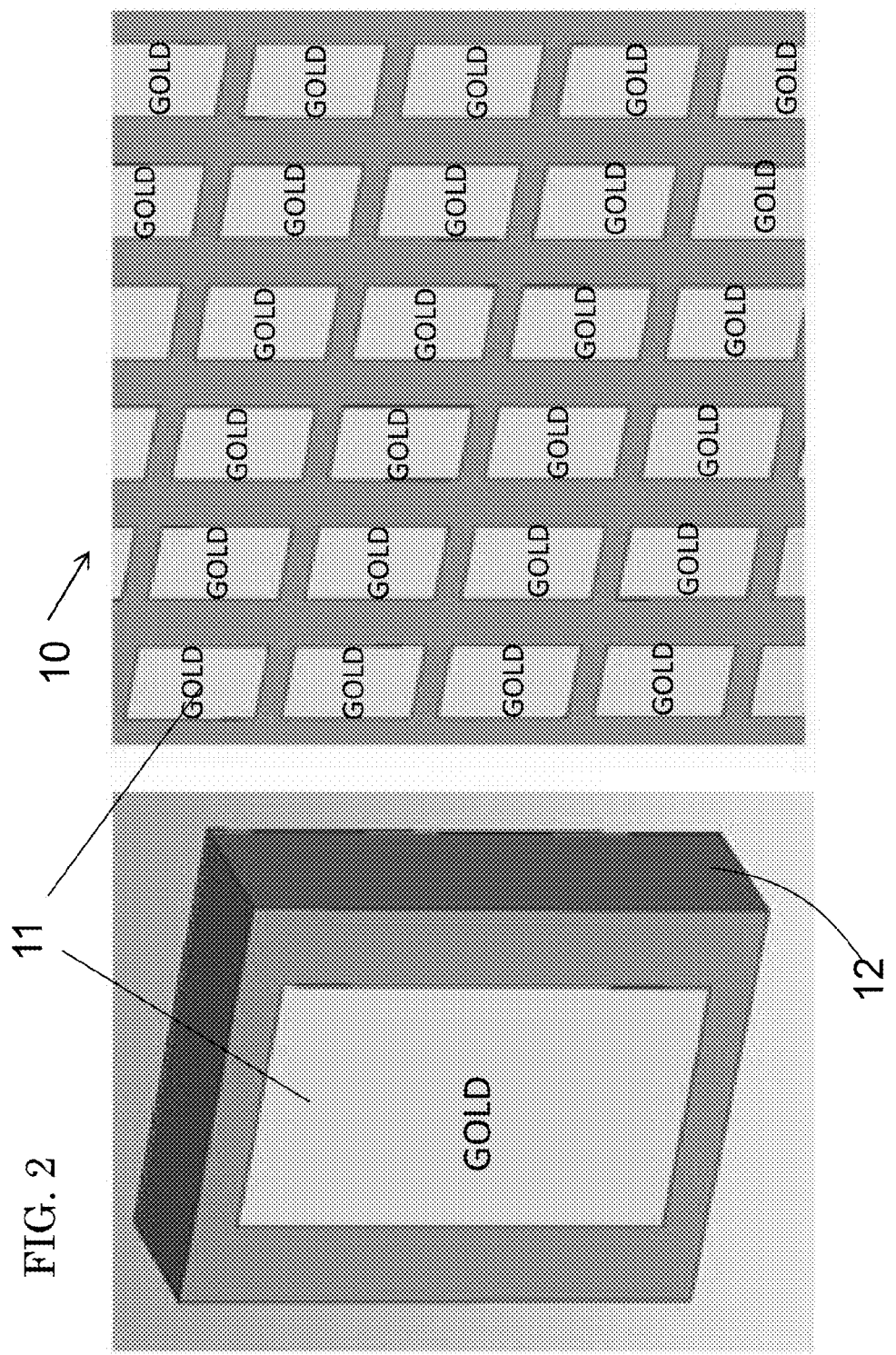
FIG. 2 illustrates the unit cell of a static reflection-mode half waveplate that is arrayed infinitely in both the horizontal and vertical directions, the rectangular patch is 119 µm×194 µm and the periodicity is 195 µm×234 µm. The polyimide spacer thickness is 68 µm and there is a continuous gold ground plane on the back side. All light colored structures may be approximately 200 nm thick.

In accordance with the principles of the present invention, a preferred embodiment of the static reflection-mode THz half and quarter waveplate for operation at a center frequency of 350 GHz was simulated, fabricated, and measured. While the design frequency was arbitrary, the waveplate band of operation can be scaled over a wide frequency range by appropriate scaling the unit cell dimensions. For clarity, the unit cell for a static reflecting half waveplate is shown in FIG. 2 with the dimensions listed in the caption. The samples were fabricated through standard photolithography, and the fabrication procedure and material parameters can be found in A. C. Strikwerda, Fan, Hu Tao, D. V. Pilon, X. Zhang, and R. D. Averitt, "Comparison of Birefringent Electric Split-ring Resonator and Meanderline Structures as Quarter-Wave Plates at Terahertz Frequencies," Opt. Express 17, 136-149 (2009) (hereby incorporated by reference) and H. Tao, C. M. Bingham, A. C. Strikwerda, D. Pilon, D. Shrekenhamer, N. I. Landy, K. Fan, X. Zhang, W. J. Padilla, and R. D. Averitt, "Highly Flexible Wide Angle of Incidence Terahertz Metamaterial Absorber: Design, Fabrication, and Characterization, Phys. Rev. B 78, 241103 (2008) (hereby incorporated by reference). The simulations were conducted using the frequency solver of CST Microwave Studios 2010.

Referring now to FIG. 2, the unit cell pictured is of a static reflection-mode half waveplate arrayed infinitely in both the horizontal and vertical directions, the rectangular patch is 119 µm×194 µm and the periodicity is 195 µm×234 µm. The polyimide spacer thickness is 68 µm and there is a continuous gold ground plane on the back side. All light colored (gold) structures may be, for example, approximately 200 nm thick.

Figure 5:
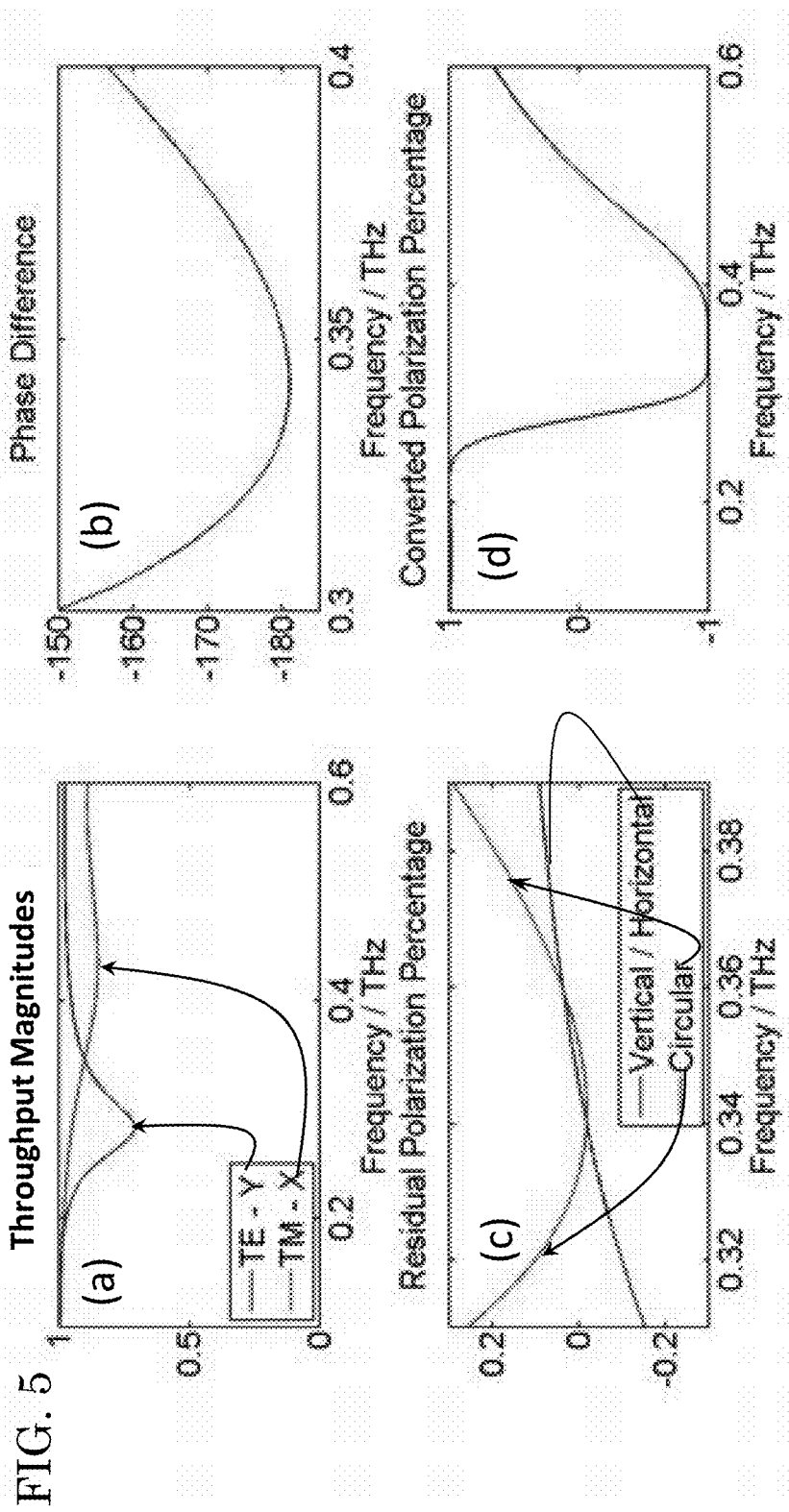
FIG. 5 graphically illustrates simulated results and normalized Stokes parameters of the static reflection-mode half waveplate wherein Plot (a) illustrates throughput as a function of frequency for TE and TM polarized radiation; Plot (b) illustrates the calculated phase difference between the TE and TM components; Plot (c) illustrates the residual circular and linearly polarized components is small over the frequency band of operation indicating the predominance of half-wave rotation; and Plot (d) illustrates the Stokes parameter is −1 in the band of operation, and 1 away from the design frequency, indicative of a 90 degree polarization rotation with respect to the incident polarization.

In simulation, both the fast and slow axes of the static reflection-mode half waveplate structure were simulated independently, yielding the top two graphs of FIG. 5. FIG. 5A shows the throughput magnitude for TE and TM polarized radiation as a function of frequency while FIG. 5B displays the phase difference (in degrees) as a function of frequency between the TE and TM components. These results were then combined to quantify the polarization as Stokes parameters as shown in FIGS. 5C and D. Regarding the Stokes parameters, see references A. C. Strikwerda, Fan, Hu Tao, D. V. Pilon, X. Zhang, and R. D. Averitt, "Comparison of Birefringent Electric Split-ring Resonator and Meanderline Structures as Quarter-wave Plates at Terahertz Frequencies," Opt. Express 17, 136-149 (2009) (hereby incorporated by reference), A. C. Strikwerda, K. Fan, G. D. Metcalfe, M. Wraback, X. Zhang, and R. D. Averitt, "Electromagnetic Composite-Based Reflecting THz Waveplates," International Journal of High Speed Electronics and Systems, Vol. 20, No. 3, p. 583-588 (2011) (hereby incorporated by reference), and D. Goldstein, Polarized Light, 2nd ed. (Marcel-Dekker, New York, 2003) (hereby incorporated by reference).

FIG. 5 graphically illustrates simulated results and normalized Stokes parameters of the static reflection-mode half waveplate. Shown are the (a) throughput as a function of frequency for TE and TM polarized radiation and (b) the calculated phase difference between the TE and TM components. (c) The residual circular and linearly polarized components are small over the frequency band of operation indicating the predominance of half-wave rotation. (d) The Stokes parameter is −1 in the band of operation, and 1 away from the design frequency, indicative of a 90 degree polarization rotation with respect to the incident polarization.

The overall intensity of the reflected light (Stokes parameter $I_O$—not shown for brevity) from the static reflection-wave half waveplate was used to normalize the remaining parameters. In the band of interest (320-372 GHz), To is ~81% as indicated by the crossing throughput magnitudes at 0.90 (FIG. 5(a)). From 320-372 GHz over 99% of the reflected light has been rotated by 90 degrees with respect to the incident polarization and the other parameters are under 1%, indicating near complete extinction of unwanted polarizations.

Figure 3:
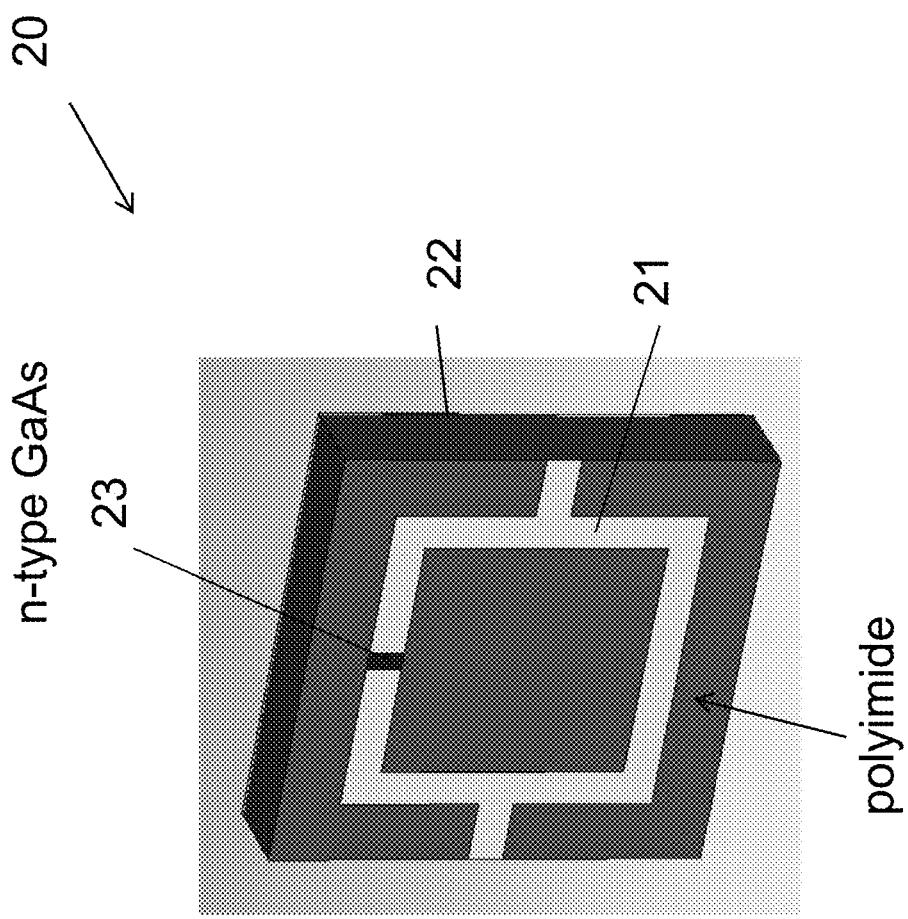
FIG. 3 graphically displays the unit cell of an electrically modulated reflection-mode quarter waveplate. The electrical SRR is fabricated on a 2 mm n-type GaAs thin layer grown on GaAs using molecular beam epitaxy. The material is etched so n-type GaAs remains only in the gap. Reverse bias of the SRR depletes the carriers in the gap and turns on the SRR resonance.

In accordance with the principles of the present invention, a preferred embodiment of the electrically modulated reflection-mode THz quarter waveplate for operation at a center frequency of ~0.55 THz was simulated. While the design frequency was arbitrary, the waveplate band of operation can be scaled over a wide frequency range by appropriate scaling the unit cell dimensions. For clarity, the unit cell for an electrically modulated reflection-mode quarter waveplate is shown in FIG. 3. The sample was fabricated through standard photolithography, and the fabrication procedure and material parameters can be found in A. C. Strikwerda, Fan, Hu Tao, D. V. Pilon, X. Zhang, and R. D. Averitt, "Comparison of Birefringent Electric Split-ring Resonator and Meanderline Structures as Quarter-Wave Plates at Terahertz Frequencies," Opt. Express 17, 136-149 (2009) (hereby incorporated by reference) and H. Tao, C. M. Bingham, A. C. Strikwerda, D. Pilon, D. Shrekenhamer, N. I. Landy, K. Fan, X. Zhang, W. J. Padilla, and R. D. Averitt, "Highly Flexible Wide Angle of Incidence Terahertz Metamaterial Absorber: Design, Fabrication, and Characterization, Phys. Rev. B 78, 241103 (2008) (hereby incorporated by reference). The simulations were conducted using the frequency solver of CST Microwave Studios 2010.

Referring now to FIG. 3, the unit cell pictured of an electrically modulated reflection-mode quarter waveplate consists of an SRR fabricated on a 2 mm n-type GaAs thin layer grown on GaAs. The material is etched such that n-type GaAs remains only in the gap of the SRR. Reverse bias between the gold ground plane Schottky contact and the SRR metamaterial ohmic contact depletes the carriers in the gap and turns on the SRR resonance. A layer of polyimide separates the SRR and the gold ground plane.

Figure 6:
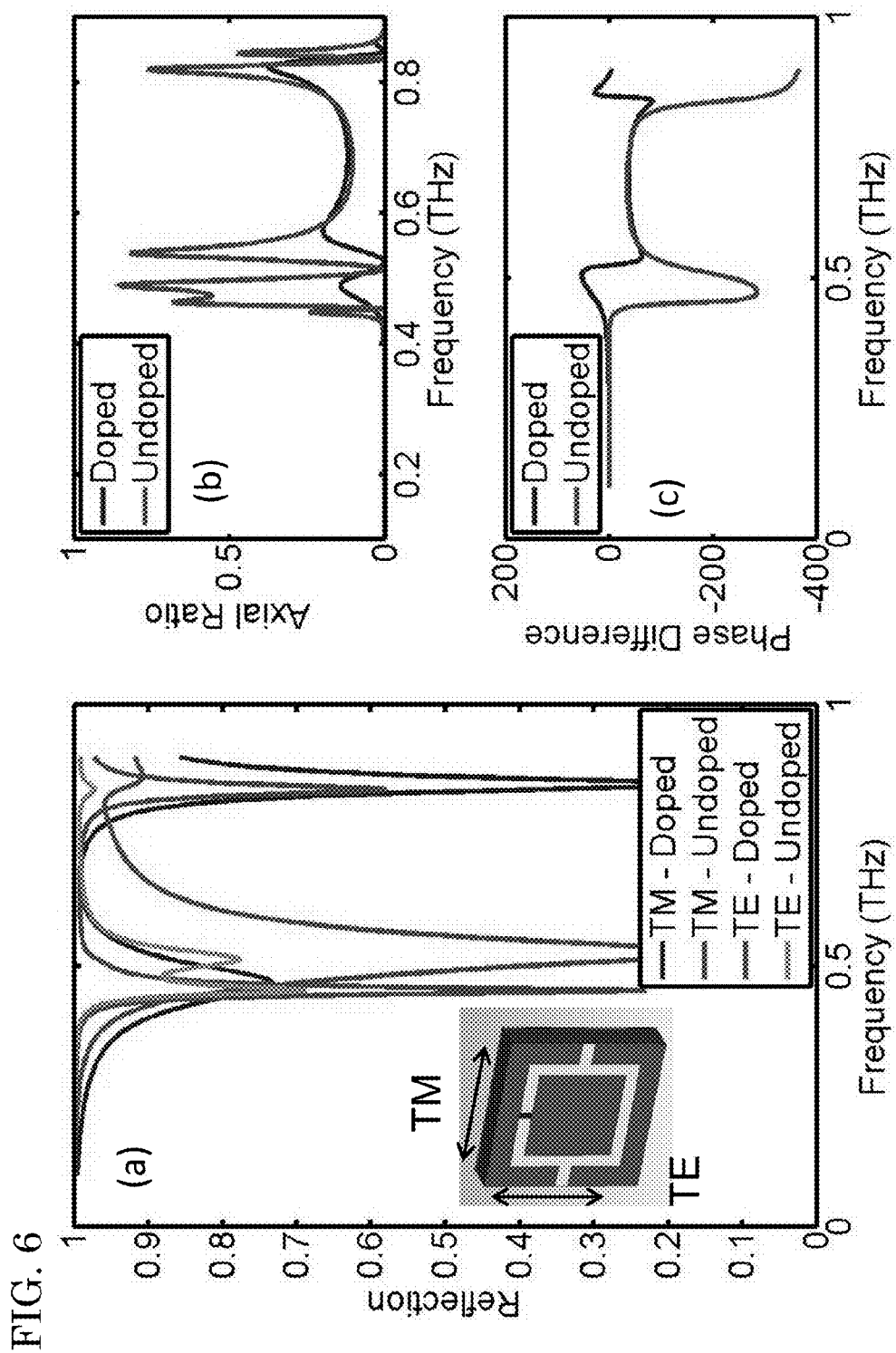
FIG. 6 displays the simulated results of the electrically modulated reflection-mode quarter waveplate wherein Plot (a) illustrates reflection of TM and TE polarized radiation, Plot (b) illustrates the axial ratio between the TE and TM components, and Plot (c) illustrates the phase difference between the TE and TM components for doped (with no electrical bias) and undoped (with electrical bias) conditions as a function of frequency are shown.

FIG. 6 displays the simulated results of the electrically modulated reflection-mode quarter waveplate. The (a) reflection of TM and TE polarized radiation, (b) the axial ratio between the TE and TM components, and (c) the phase difference between the TE and TM components for doped (with no electrical bias) and undoped (with electrical bias) conditions as a function of frequency are shown. The TM mode is with the THz electric field aligned along the bar with the gap. The TE mode is with the THz electric field aligned along the bar perpendicular to the bar with the gap.

Figure 7:
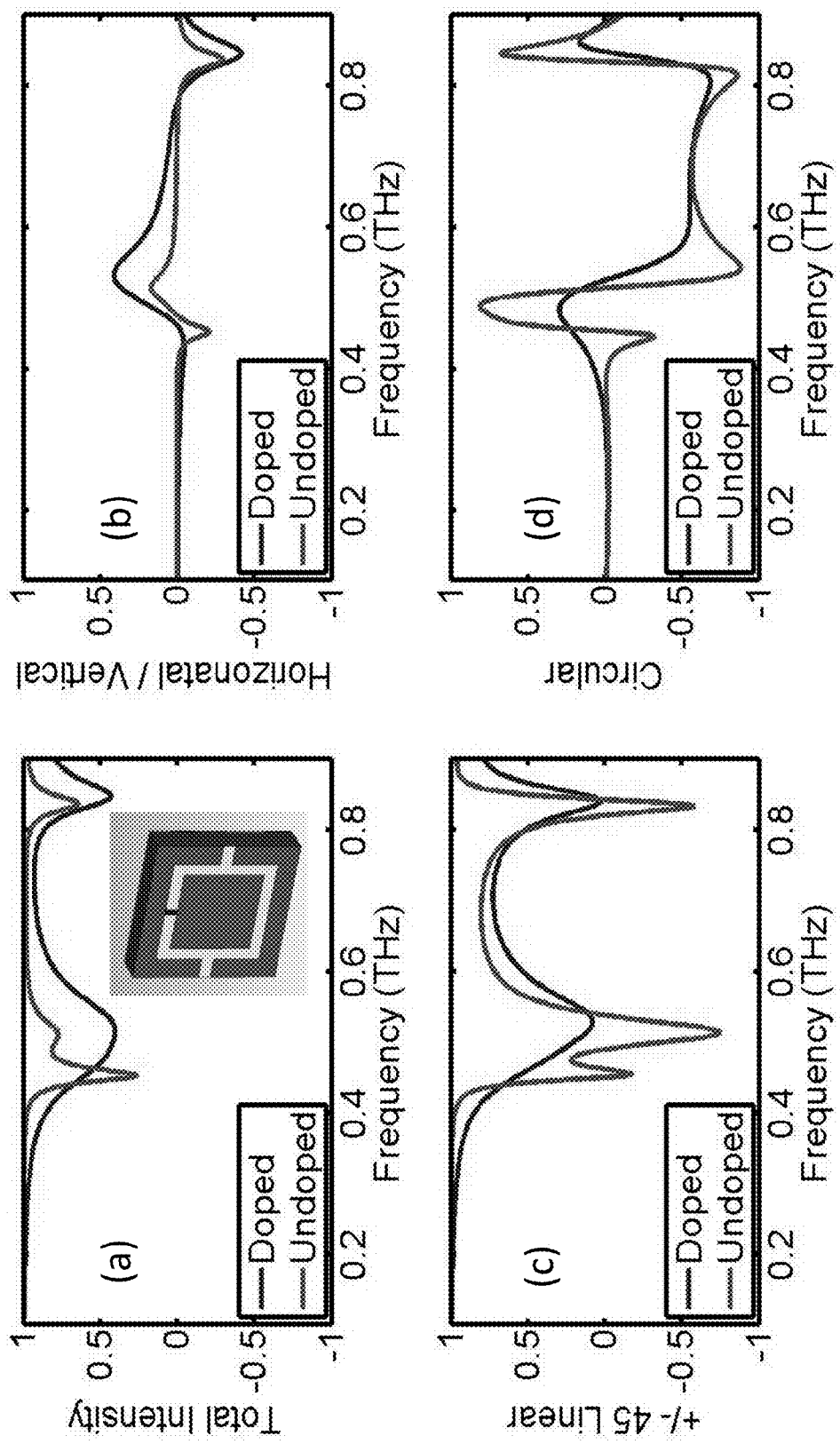
FIG. 7 displays the simulated results of the normalized Stokes parameters of the electrically modulated reflection-mode quarter waveplate wherein Plot (a) illustrates total intensity, Plot (b) illustrates the degree of horizontal and vertical polarization, Plot (c) illustrates the degree of linear polarization at +45 and −45 degrees, and Plot (d) illustrates the degree of circular polarization of the reflected light for doped (with no electrical bias) and undoped (with electrical bias) conditions.

FIG. 7 displays the simulated results of the normalized Stokes parameters of the electrically modulated reflection-mode quarter waveplate: (a) total intensity, (b) the degree of horizontal and vertical polarization, (c) the degree of linear polarization at +45 and −45 degrees, and (d) the degree of circular polarization of the reflected light for doped (with no electrical bias) and undoped (with electrical bias) conditions.

Figure 4:
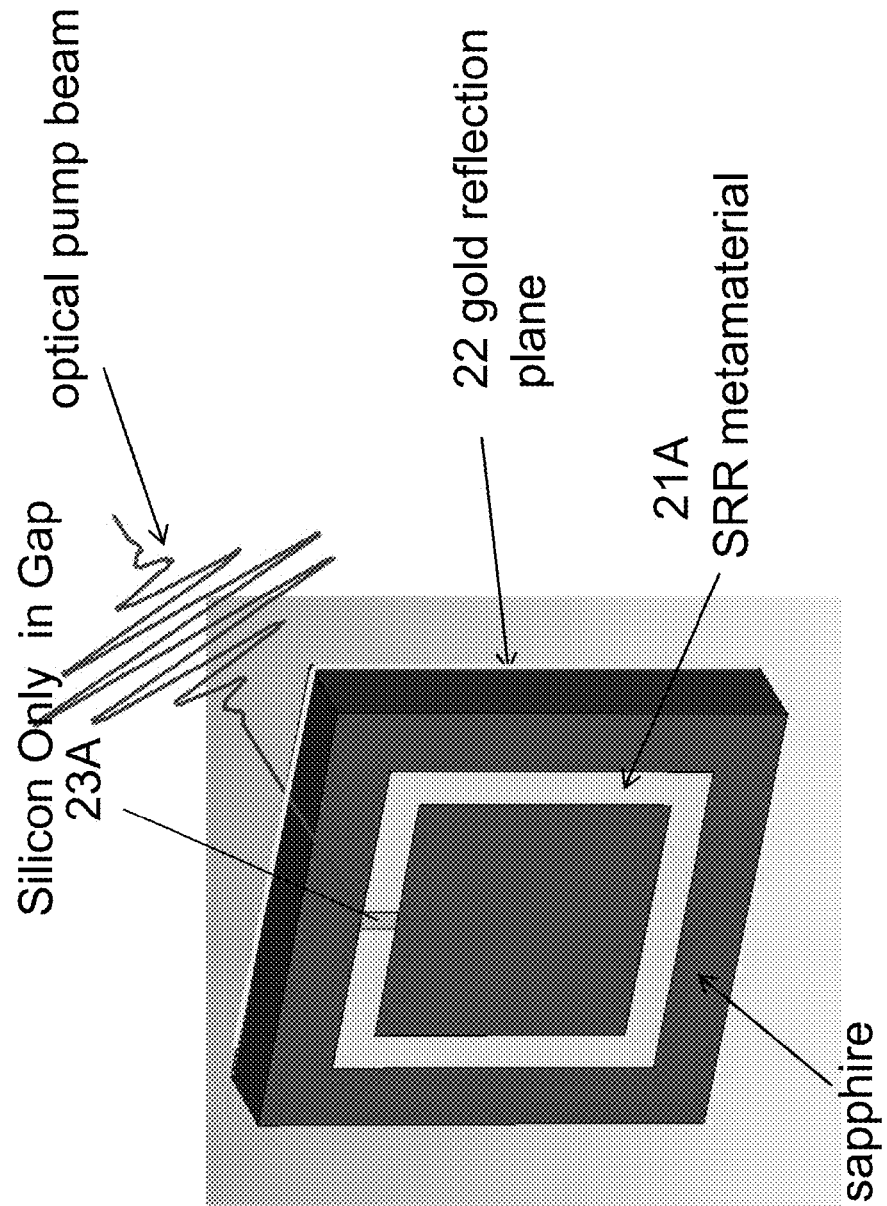
FIG. 4 graphically displays the unit cell of an optically modulated reflection-mode quarter waveplate. The electrical SRR is fabricated on silicon on sapphire. The material is etched so Si remains only in the gap. Photoexcitation generates electron-hole pairs in the Si thereby shorting the gap and turning off the SRR resonance.

In accordance with the principles of the present invention, a preferred embodiment of the optically modulated reflection-mode THz quarter waveplate for operation at a center frequency of ~0.65 THz was simulated. While the design frequency was arbitrary, the waveplate band of operation can be scaled over a wide frequency range by appropriate scaling the unit cell dimensions. For clarity, the unit cell for an optically modulated reflection-mode quarter waveplate is shown in FIG. 4. The sample was fabricated through standard photolithography, and the fabrication procedure and material parameters can be found in A. C. Strikwerda, Fan, Hu Tao, D. V. Pilon, X. Zhang, and R. D. Averitt, "Comparison of Birefringent Electric Split-ring Resonator and Meanderline Structures as Quarter-Wave Plates at Terahertz Frequencies," Opt. Express 17, 136-149 (2009) (hereby incorporated by reference) and H. Tao, C. M. Bingham, A. C. Strikwerda, D. Pilon, D. Shrekenhamer, N. I. Landy, K. Fan, X. Zhang, W. J. Padilla, and R. D. Averitt, "Highly Flexible Wide Angle of Incidence Terahertz Metamaterial Absorber: Design, Fabrication, and Characterization, Phys. Rev. B 78, 241103 (2008) (hereby incorporated by reference). The simulations were conducted using the frequency solver of CST Microwave Studios 2010.

Referring now to FIG. 4, the unit cell pictured of an optically modulated reflection-mode quarter waveplate consists of an electrical SRR fabricated on silicon on sapphire. The material is etched so Si remains only in the gap. Photoexcitation generates electron-hole pairs in the Si thereby shorting the gap and turning off the SRR resonance.

Figure 8:
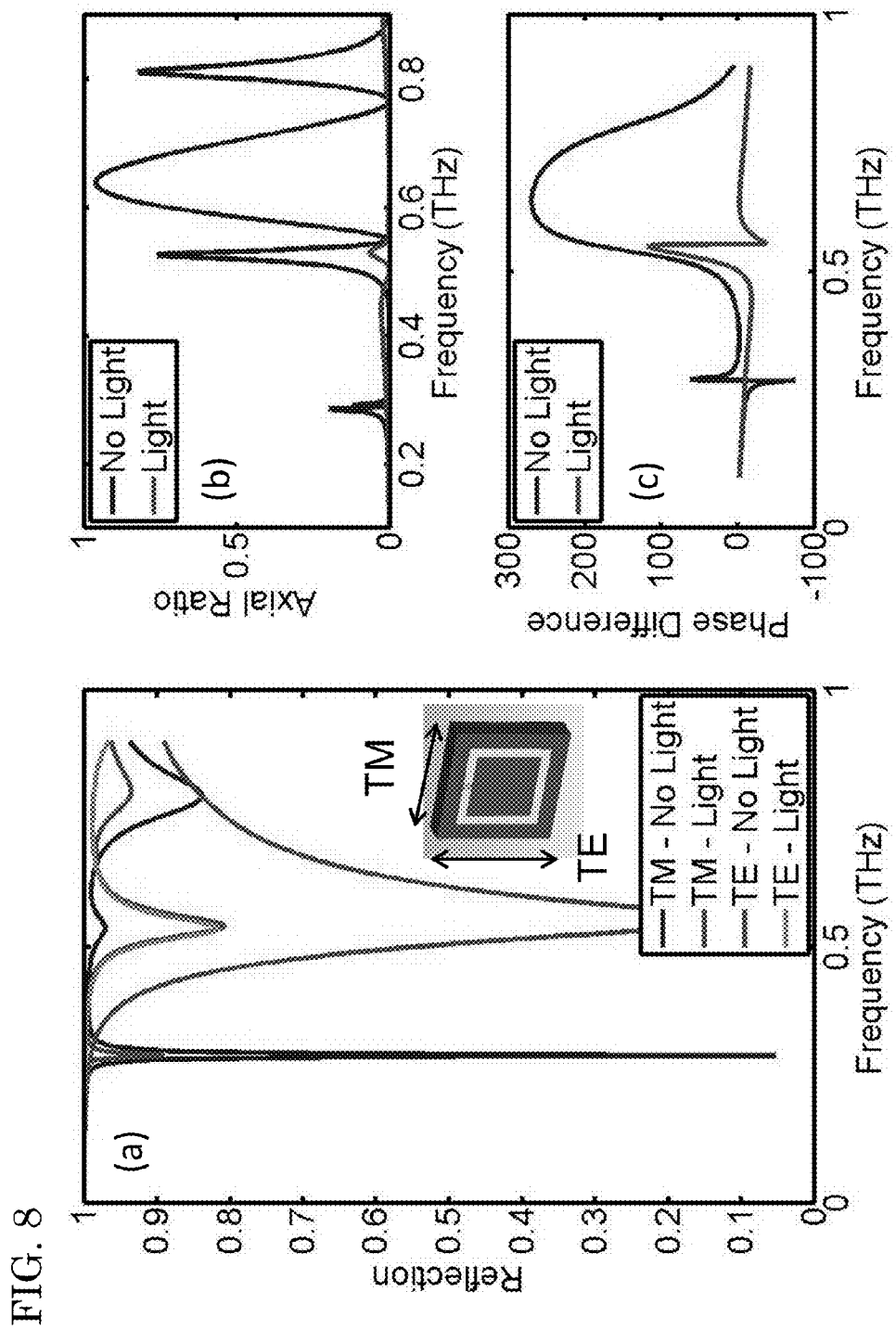
FIG. 8 displays the simulated results of the optically modulated reflection-mode quarter waveplate wherein Plot (a) illustrates the reflection of TM and TE polarized radiation, Plot (b) illustrates the axial ratio between the TE and TM components, and Plot (c) illustrates the phase difference between the TE and TM components for no light (with no optical bias) and with light (with optical bias) conditions as a function of frequency are shown.

FIG. 8 displays the simulated results of the optically modulated reflection-mode quarter waveplate. The (a) reflection of TM and TE polarized radiation, (b) the axial ratio between the TE and TM components, and (c) the phase difference between the TE and TM components for no light (with no optical bias) and with light (with optical bias) conditions as a function of frequency are shown. The TM mode is with the THz electric field aligned along the bar with the gap. The TE mode is with the THz electric field aligned along the bar perpendicular to the bar with the gap.

Figure 9:
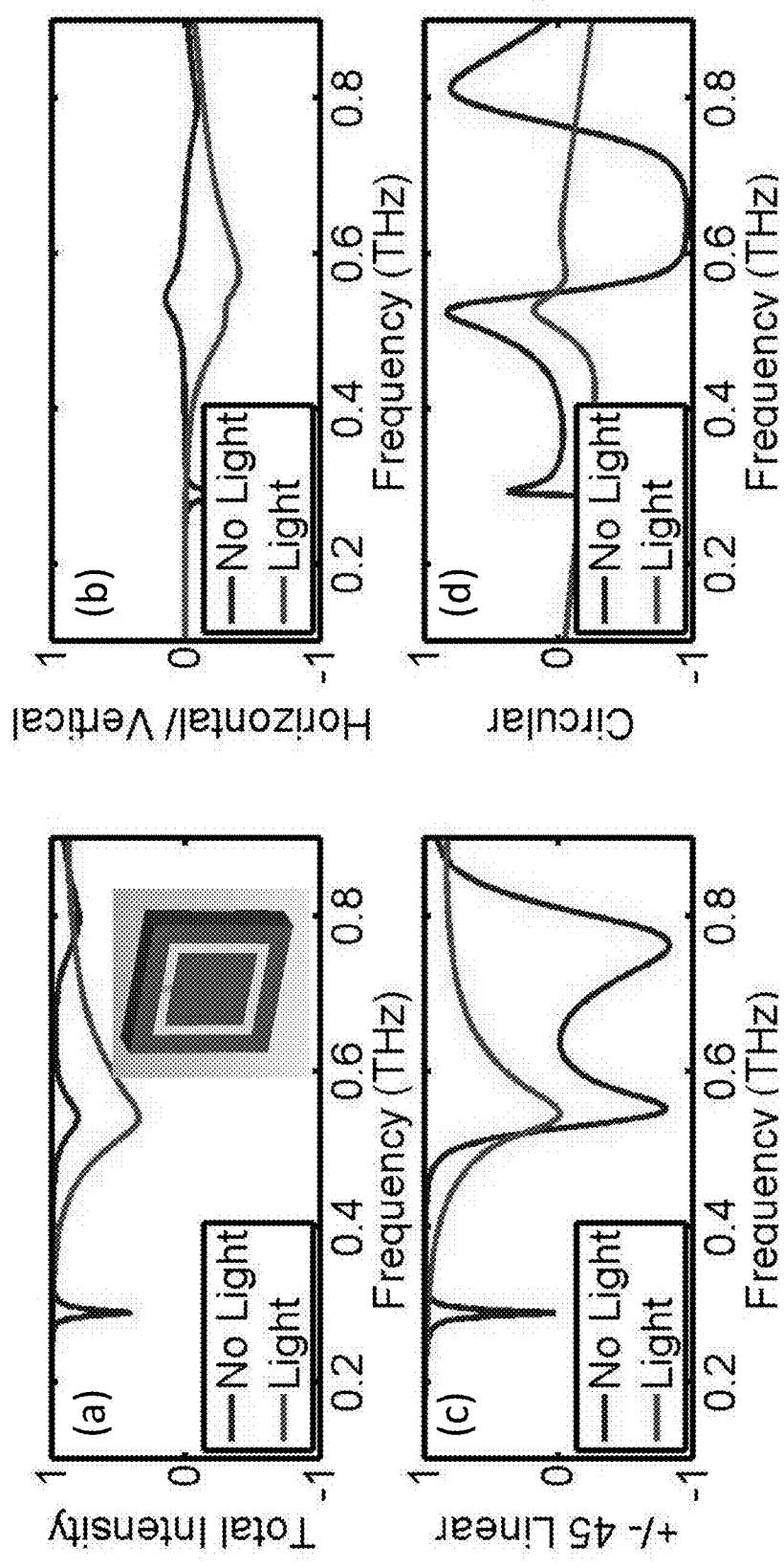
FIG. 9 displays the simulated results of the normalized Stokes parameters of the optically modulated reflection-mode quarter waveplate wherein Plot (a) illustrates the total intensity, Plot (b) illustrates the degree of horizontal and vertical polarization, Plot (c) illustrates the degree of linear polarization at +45 and −45 degrees, and Plot (d) illustrates the degree of circular polarization of the reflected light for no light (with no optical bias) and with light (with optical bias) conditions.

FIG. 9 displays the simulated results of the normalized Stokes parameters of the optically modulated reflection-mode quarter waveplate: (a) total intensity, (b) the degree of horizontal and vertical polarization, (c) the degree of linear polarization at +45 and −45 degrees, and (d) the degree of circular polarization of the reflected light for no light (with no optical bias) and with light (with optical bias) conditions.

EXPERIMENTAL RESULTS

To validate the simulated results, the static half and quarter reflection-mode waveplates were fabricated and tested on a CW photomixing THz spectroscopy system operating in a heterodyne configuration. See, A. Majewski, R. Abreu, and M. Wraback, A High Resolution Terahertz Spectrometer for Chemical Detection, Proc. SPIE 6549, 65490B (2007), D01:10.1117/12.719485, hereby incorporated by reference. The spectrometer is continuously tunable between 0.09 and 1.2 THz with ~1 MHz resolution.

Figure 10:
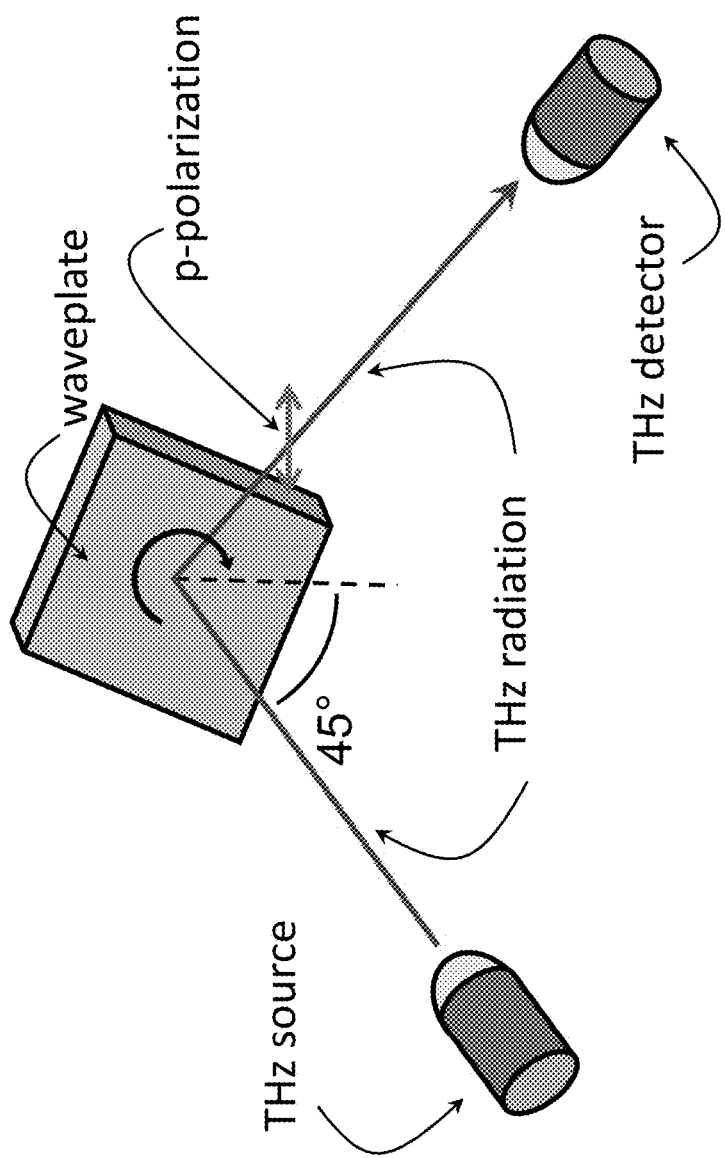
FIG. 10 schematically illustrates the experimental setup for characterizing a reflection-mode waveplate wherein the reflection-mode waveplate is illuminated with a 350 GHz linearly polarized CW THz beam from a photomixer source at a 45 degree incidence angle, and the reflected beam is detected by a polarization sensitive photomixer as a function of the rotation angle of the waveplate.
Figure 11:
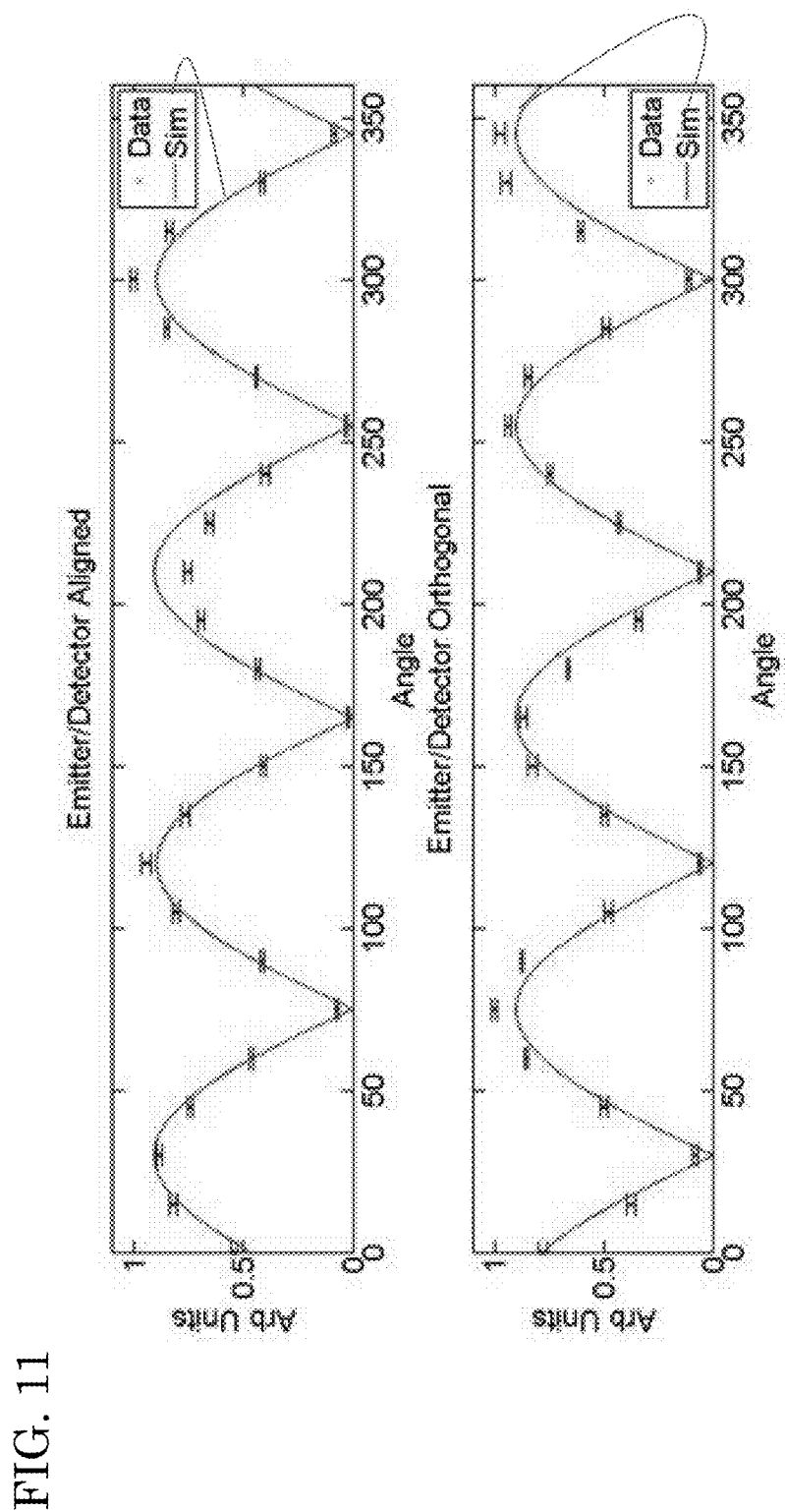
FIG. 11 graphically illustrates the static reflection-mode half waveplate that was rotated while being illuminated by 350 GHz CW radiation; as the fast/slow axes of the waveplate align with the polarization, a maximum in the "Aligned" configuration corresponds to a minimum in the "Orthogonal" configuration, and, similarly, the "Orthogonal" configuration results in a maximum when the incident polarization is at 45 degrees relative to the fast/slow axes of the electromagnetic composite.

The system emits a linearly polarized CW THz beam and has a polarization sensitive detector. In one testing setup, as shown in FIG. 10, the static reflection-mode half waveplate was placed on a rotating sample holder with an incident beam at a 45 degree angle. Two configurations were measured, one where the polarization sensitive detector was aligned parallel to the polarization of the emitter, and one where the detector was orthogonal to the polarization of the emitter. The half waveplate was then illuminated by a 350 GHz CW beam and rotated in place while the detected signal amplitude was recorded as a function of angle. The results, plotted against simulation, are shown in FIG. 11, and clearly demonstrate both the conversion, and extinction, of the incident polarization as a function of waveplate rotation. There are four maxima and minima as expected due to the rectangular nature of the unit cell and consistent with a diagonal Jones matrix for the half waveplate that is sandwiched between two rotation matrices to model waveplate rotation.

For the illustration of FIG. 11, the static reflection-mode half waveplate was rotated while being illuminated by 350 GHz CW radiation. As the fast/slow axes of the waveplate align with the polarization, a maximum in the "Aligned" configuration corresponds to a minimum in the "Orthogonal" configuration. Similarly, the "Orthogonal" configuration results in a maximum when the incident polarization is at 45 degrees relative to the fast/slow axes of the electromagnetic composite.

Figure 12:
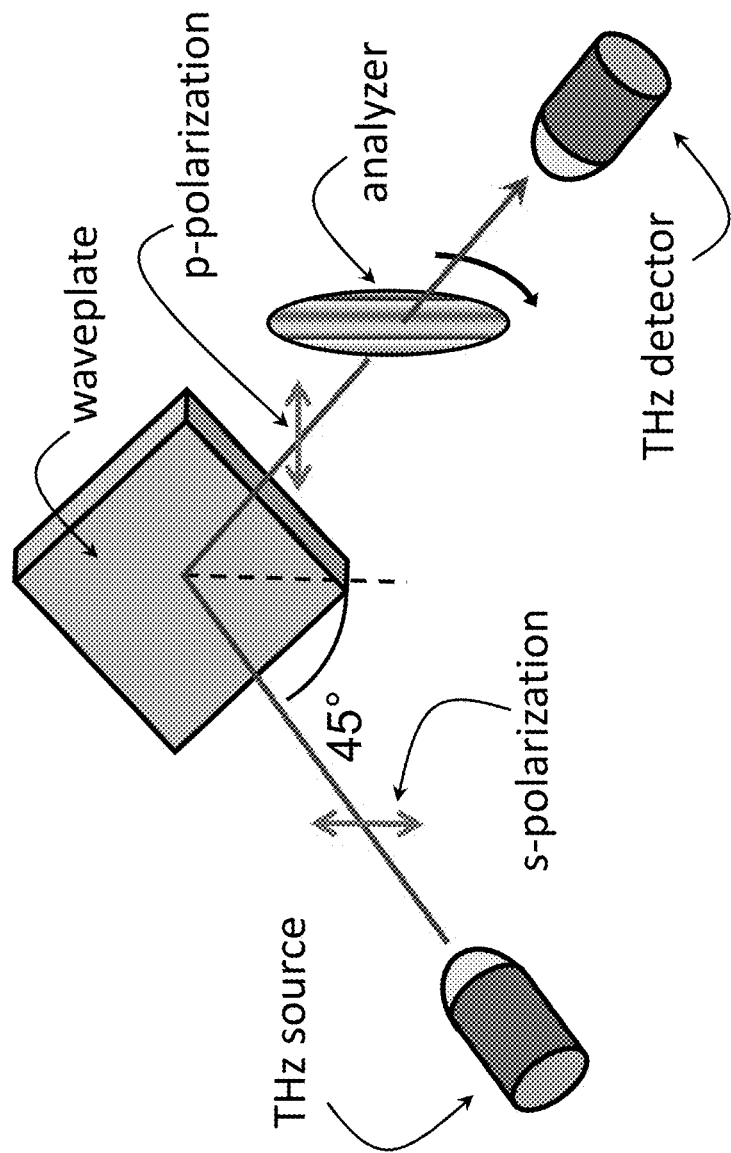
FIG. 12 schematically illustrates the experimental setup wherein the reflection-mode waveplate is illuminated with a 350 GHz linearly polarized CW THz beam from a photomixer source at a 45 degree incidence angle. The fast/slow axes of the electromagnetic composite are aligned at 45 degrees relative to the polarization of the incident THz beam. The reflected beam is detected through an analyzer by a polarization sensitive photomixer as a function of the rotation angle of the analyzer.

In a second testing setup, as shown in FIG. 12, the static reflection-mode waveplate is fixed on a sample holder such that the fast/slow axes of the electromagnetic composite is aligned at 45 degrees relative to the polarization of the incident THz beam. The waveplate is illuminated with a 350 GHz linearly polarized CW THz beam from a photomixer source at a 45 degree incidence angle. The reflected beam is sent through an analyzer into a polarization sensitive photomixer. The analyzer is mounted on a rotation stage. The reflected signal is detected as a function of the rotation angle of the analyzer. S-polarized refers to light polarized perpendicular to the plane of incidence. P-polarized refers to light polarized parallel to the plane of incidence.

Figure 13:
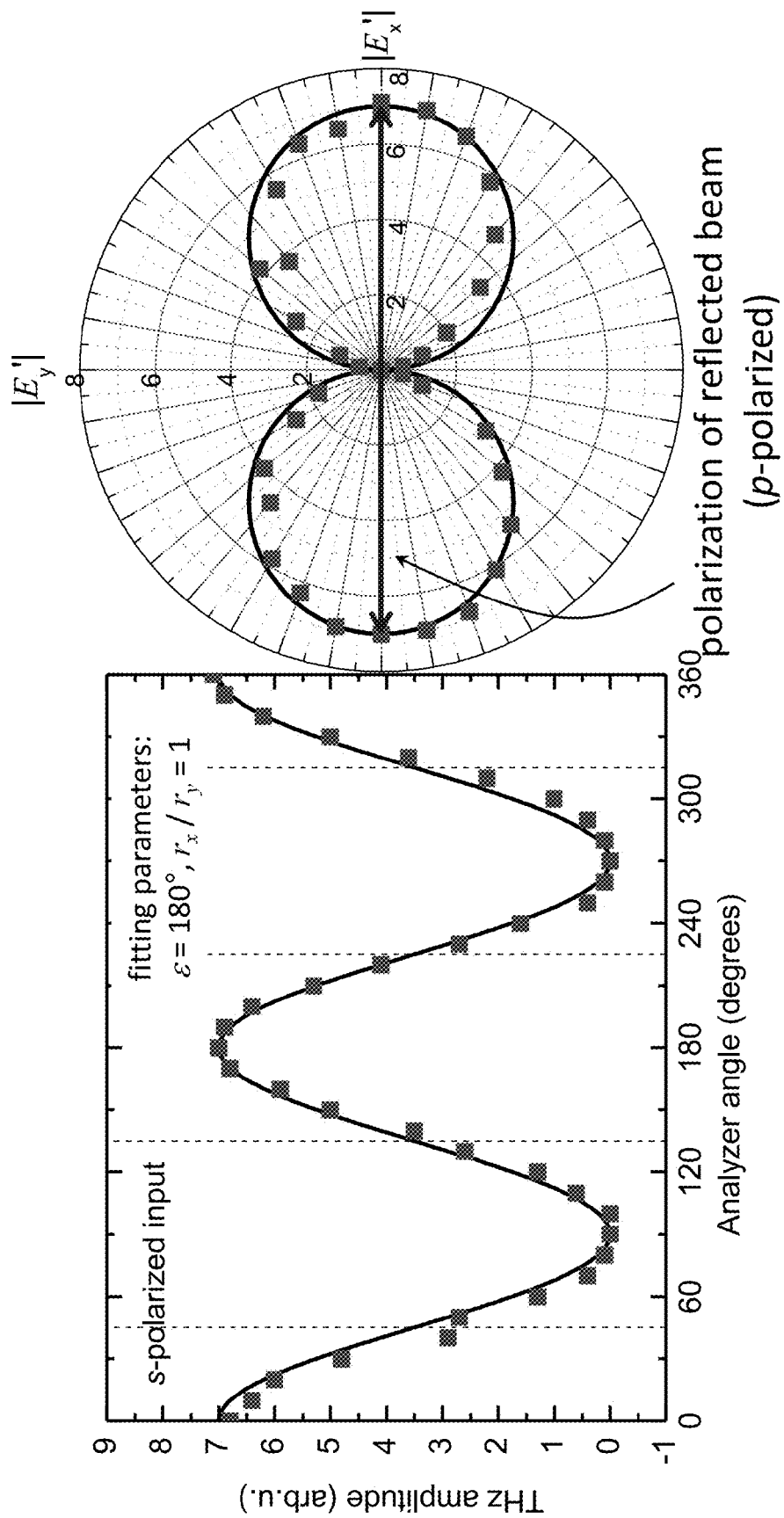
FIG. 13 displays the measured amplitude (red squares) of s-polarized incident THz beam reflected off the static reflection-mode half waveplate as a function of the analyzer rotation angle.
Figure 14:
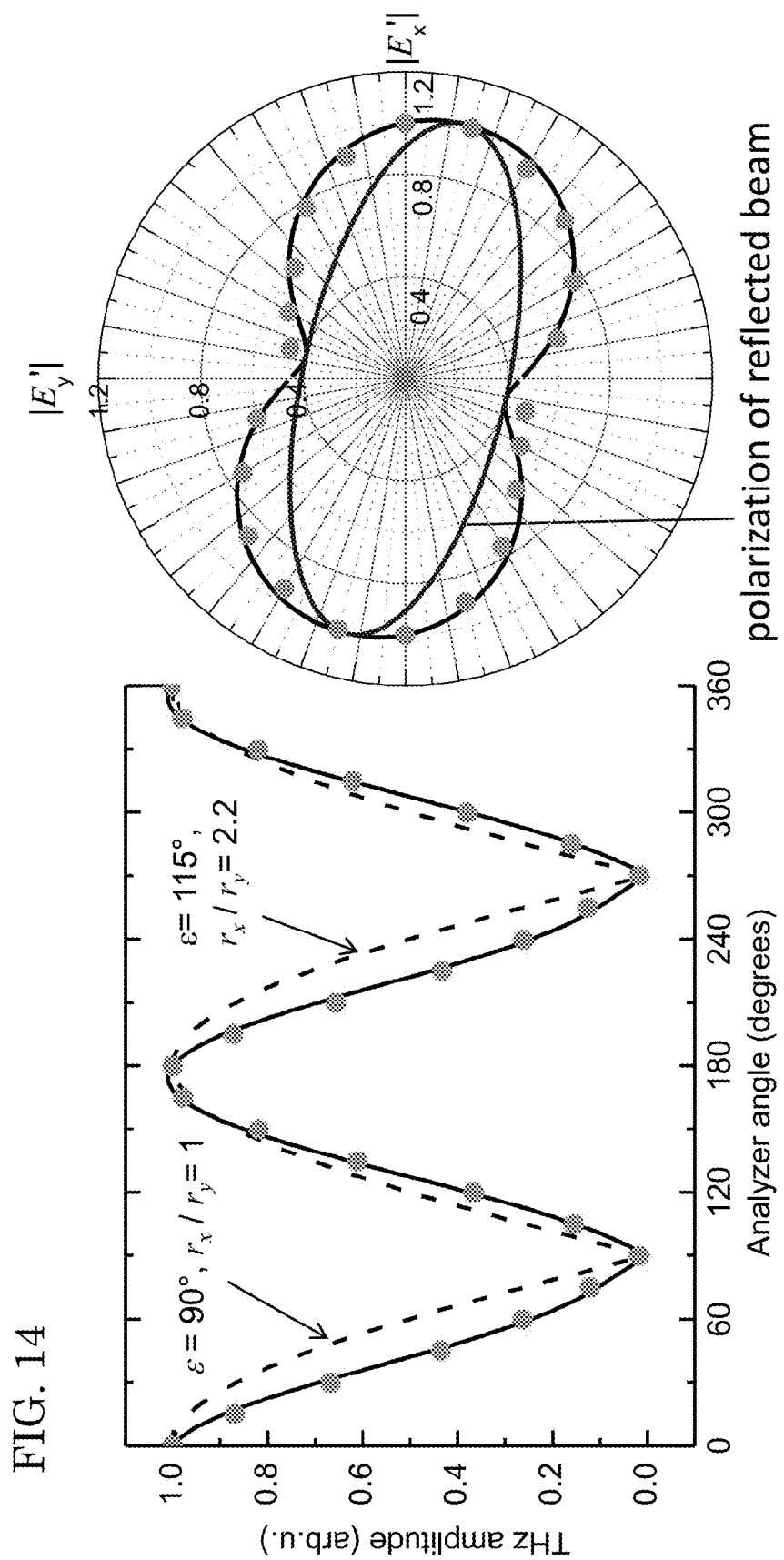
FIG. 14 displays the measured amplitude (green circles) of s-polarized incident THz beam reflected off the static reflection-mode quarter waveplate as a function of the analyzer rotation angle.

The experimental results are illustrated in FIG. 13 for the static reflection-mode half waveplate and in FIG. 14 for the static reflection-mode quarter waveplate. The data is fit with modeling using Jones Matrix analysis detailed in G. D. Metcalfe, M. Wraback, A. C. Strikwerda, K. Fan, X. Zhang, and R. D. Averitt, "Terahertz Polarimetry Based on Metamaterial Devices," *Proc. SPIE* Vol. 8363, 836300 (2012) and D. Goldstein, *Polarized Light*, 2nd ed. (Marcel-Dekker, New York, 2003). The waveplate is represented by a diagonal Jones matrix. The analyzer is represented by a separate diagonal Jones matrix which is sandwiched between two rotation matrices.

For the static reflection-mode half waveplate, the experimental data displayed in FIG. 13 corresponds well with modeling based on Jones Matrix analysis (black solid line). The fitting parameters are the relative phase shift between the TM and TE components, $\in$, and the ratio of the reflection amplitudes of the TM and TE amplitudes $r_x/r_y$. The data fits well to $\in=180$ degrees and $r_x/r_y=1$, indicating the polarization of the reflected beam is rotated relative to the incident beam by 90 degree; i.e., the experimental data corresponds well with modeling based on Jones Matrix analysis (black solid line) with the phase shift $\in=180$ degrees and the ratio of reflection amplitudes $r_x/r_y=1$, indicating the polarization of the reflected beam is rotated relative to the incident beam by 90 degrees.

For the static reflection-mode quarter waveplate, the experimental data displayed in FIG. 14 fits well to modeling based on Jones Matrix analysis where the fit parameters are $\in=115$ degrees and $r_x/r_y=2.2$. The fit results indicate that the polarization of the reflected beam is almost circularly polarized.

Figure 15:
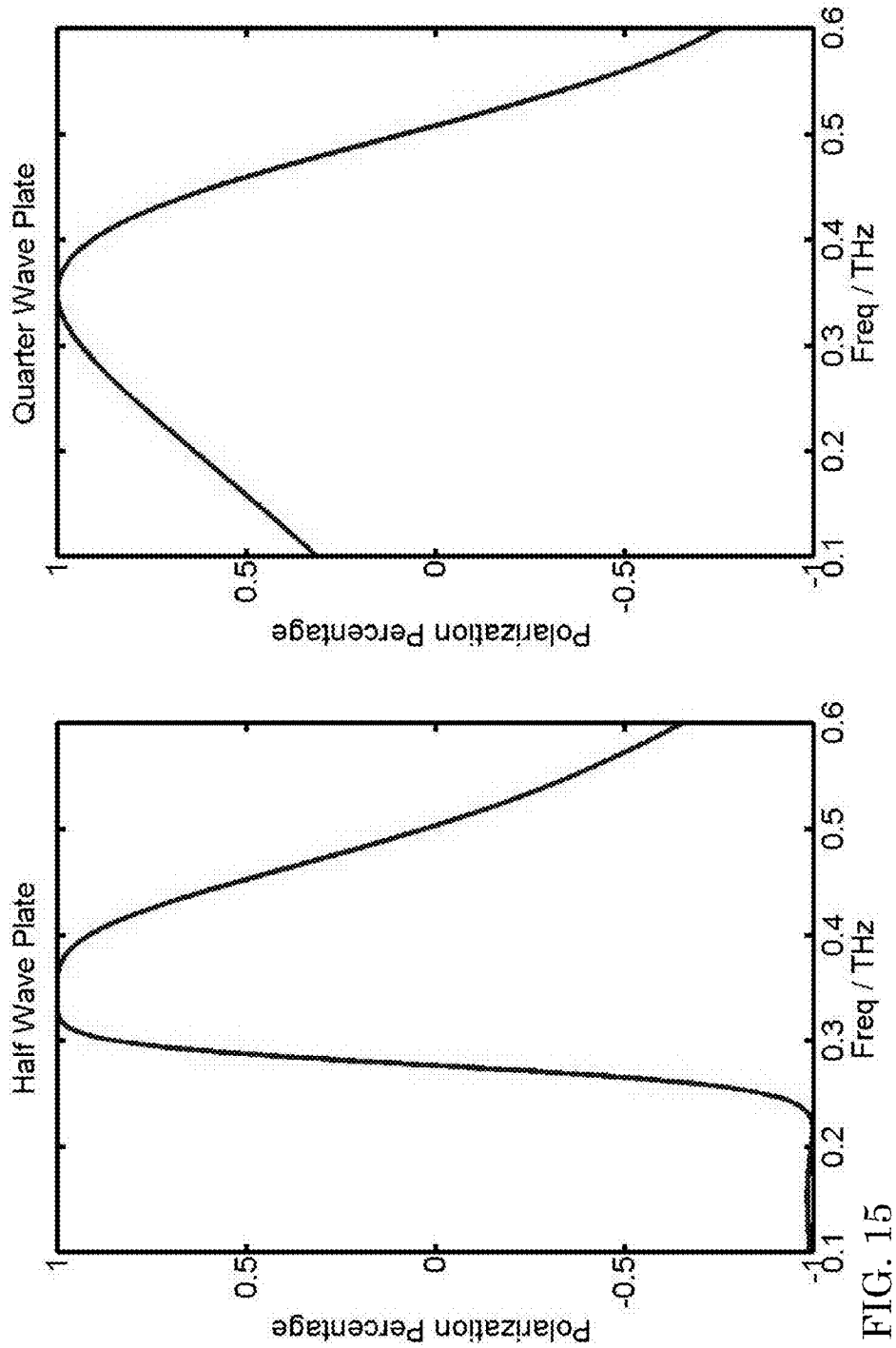
FIG. 15 displays the broadband polarization conversion of the simulated static reflection mode half waveplate (left) and quarter waveplate (right).

FIG. 15 displays the broadband polarization conversion of the simulated static reflection mode half waveplate (left) and quarter waveplate (right). Away from the design frequency the half waveplate has a −1 because the incident light is at a 90 degree rotation from the desired polarization. The polarization percentage of the simulated static reflection-mode half waveplate (left) and quarter waveplate (right) is illustrated.

Figure 16:
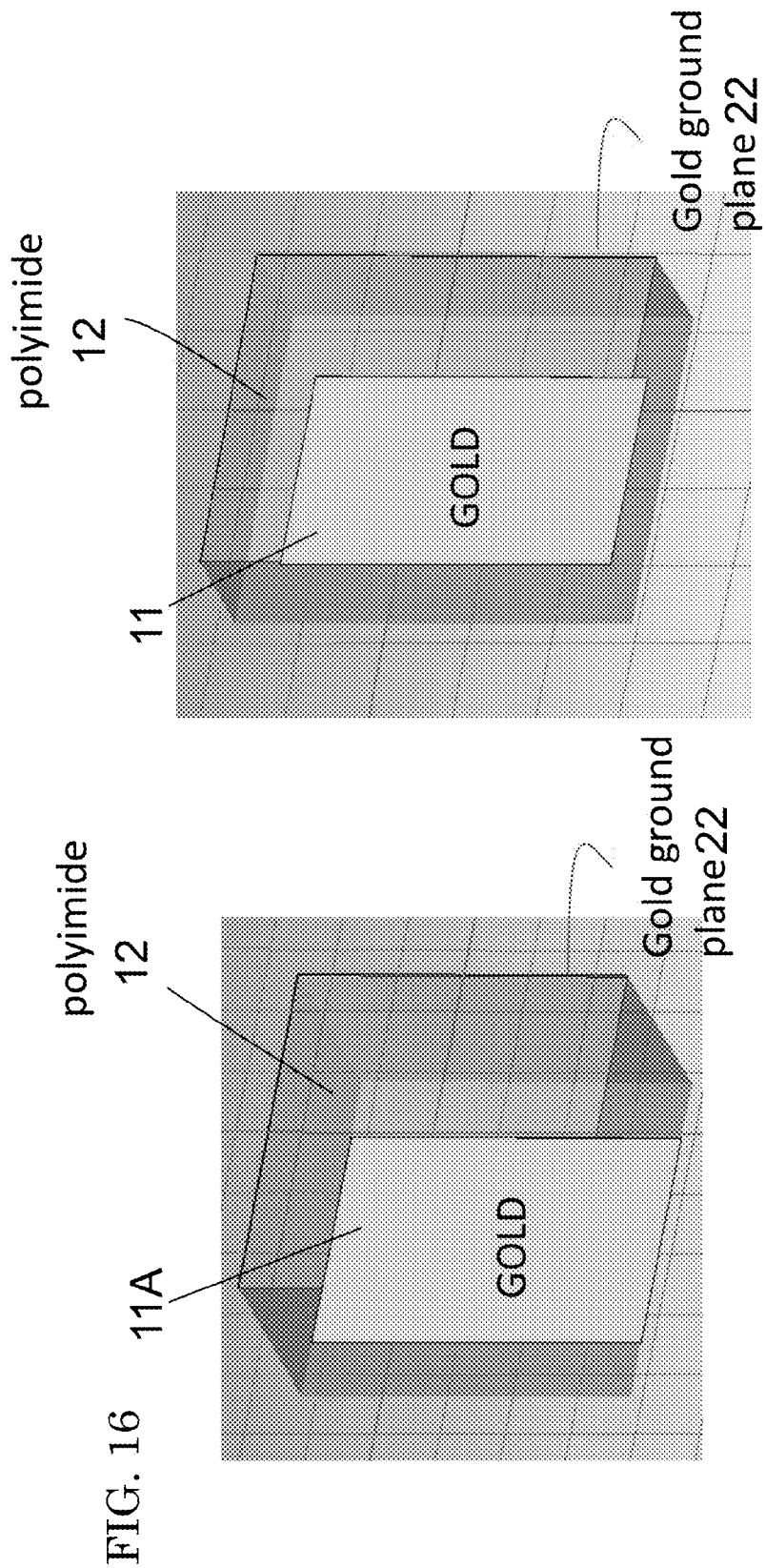
FIG. 16 illustrates the unit cell of the static reflection-mode quarter waveplate on the left. The unit cell is arrayed infinitely in the vertical and horizontal directions. The gold strip is 68 µm wide with a period of 103 µm, and the polyimide spacer is 62 µm thick on top of a continuous gold ground plane. The unit cell of the static reflection-mode half waveplate is pictured on the right. The rectangular patch is 119 µm×194 µm and the periodicity is 195 µm×234 µm. The polyimide spacer is 68 µm and beneath it is a continuous gold ground plane. All gold structures are 200 nm thick.

FIG. 16 illustrates the unit cell of the static reflection-mode quarter waveplate on the left. The unit cell is arrayed infinitely in the vertical and horizontal directions. The gold strip is 68 μm wide with a period of 103 μm, and the polyimide spacer is 62 μm thick on top of a continuous gold ground plane. The unit cell of the static reflection-mode half waveplate is pictured on the right. The rectangular patch is 119 μm×194 μm and the periodicity is 195 μm×234 μm. The polyimide spacer is 68 μm and beneath it is a continuous gold ground plane. All gold structures are 200 nm thick.

In summary, functional static reflection-mode THz half and quarter waveplates were designed that, in comparison to previous transmission-mode waveplates, exhibit an increased intensity throughput efficiency. The throughput efficiency for the half waveplate was 80% for the reflection-mode in comparison to 50% for the half waveplate in transmission-mode. The static reflection-mode half waveplate also simultaneously doubled the induced phase shift resulting in a functional half waveplate with a center frequency of 350 GHz. The static reflection-mode quarter waveplate exhibits an increased intensity throughput efficiency of 95% in comparison to 50% for the transmission-mode waveplate. The static reflection-mode quarter waveplate also simultaneously induces a ~90 degree relative phase shift resulting in a functional quarter waveplate with a center frequency of 350 GHz. More generally, it is our belief that designing THz components in reflection will provide an avenue for lower loss THz components.

The designed and simulated dynamic reflection-mode quarter waveplates show a high degree of polarization conversion. The waveplates can be externally modulated either electrically or optically.

Here THz half and quarter waveplates are presented for operation in reflection-mode. Compared to previous work, these reflection-mode waveplates have a greatly increased efficiency while maintaining the high degree of polarization conversation and ease of fabrication. These structures consist of Au and polyimide, and have the additional advantages of being compact, flexible, and easily fabricated over large areas using standard microfabrication processing. The waveplates were simulated using CST Microwave Studios, and designed for operation at 0.350 THz with a 45 degree angle of incidence. Both of these structures achieved over 99% polarization conversion, with a reflected intensity of 81% and 95% for the half and quarter waveplate, respectively. These performance factors were calculated by extracting the Stokes' Parameters from our simulation results. FIG. 15 displays their broadband polarization conversion, and the physical dimensions are displayed in FIG. 16. The experimental results are analyzed using Jones Matrix calculations to extract the induced phase shift and reflection coefficients of the waveplates. While these structures were designed for 0.350 THz, this frequency is easily adjustable by appropriate scaling of the waveplate dimensions. Due to the ease of their scaling, robust nature, and incredible simplicity, the preferred embodiment waveplates are an attractive choice for use in CW THz systems.

As used herein the terminology ground layer includes ground plate.

As used herein, the terminology split ring resonator refers to split rings formed from a composite material used to produce a magnetic response in various metamaterials. The splits in the ring (or rings) enable the structure to support resonant wavelengths much larger than the size of the rings.

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A reflection-mode waveplate for operation in the terahertz region by shifting the phase between two perpendicular polarization components of the light wave, comprising
a ground plane;

an array of polygonal unit cells; the polygonal unit cells comprising a polymer positioned between the ground plane and the exterior of the array of polygonal unit cells configured to form a waveplate;

whereby the waveplate operates to shift the phase between two perpendicular polarization components of the light wave.

2. The waveplate of claim 1 wherein the polygonal unit cell is 119 µm×194 µm and the periodicity is 195 µm×234 µm and wherein the polymer comprises a polyimide spacer having a thickness of 68 µm and wherein the ground plane is a continuous gold ground plane, and wherein the polygonal unit cells are approximately 200 nm thick.

3. The waveplate of claim 1 wherein the waveplate is a static reflection-mode half waveplate that is arrayed in both the horizontal and vertical directions.

4. The waveplate of claim 1 wherein the waveplate is a quarter wave plate.

5. The waveplate of claim 1 wherein the waveplate is a half wave plate.

6. The waveplate of claim 1 wherein the waveplate is electrically modulated.

7. A reflection-mode waveplate for operation in the terahertz region by shifting the phase between two perpendicular polarization components of the light wave, comprising a ground plane;

an array of polygonal unit cells; the polygonal unit cells comprising a polymer positioned between the ground plane and the exterior of the array of polygonal unit cells;

wherein the waveplate can be externally modulated either electrically or optically.

8. A waveplate comprising an array of unit cells; each unit cell comprising a ground layer;

a polymer material layer;

a layer of GaAs;

n-type GaAs thin layer grown on the GaAs layer; and a split ring resonator fabricated on the n-type GaAs thin layer grown on GaAs; the split ring resonator having a gap such that when a reverse bias is applied between the ground layer and the split ring resonator, the carriers in the gap are depleted and the split ring resonator resonance turns on.

9. The waveplate of claim 8 wherein the ground and polymer layers of the unit cells are contiguous.

10. The waveplate of claim 8 wherein the polymer material layer is polyimide.

11. The waveplate of claim 8 wherein the ground layer is a gold ground layer Schottky contact and the split ring resonator comprises a metamaterial ohmic contact, and wherein when a reverse bias is applied between the gold ground layer Schottky contact and the split ring resonator metamaterial ohmic contact the carriers in the gap are depleted and the split ring resonator resonance turns on.

12. The waveplate of claim 8 where the n-type GaAs thin layer is approximately 2 micrometers thick.

13. The waveplate of claim 8 wherein the split ring resonator material layer is etched such that the gap in the split ring comprises n-type GaAs.

14. The waveplate of claim 8 wherein the split ring resonator material layer is etched such that n-type GaAs only remains only in the gap of the split ring resonator material layer.

* * * * *